United States Patent Office 3,433,707
Patented Mar. 18, 1969

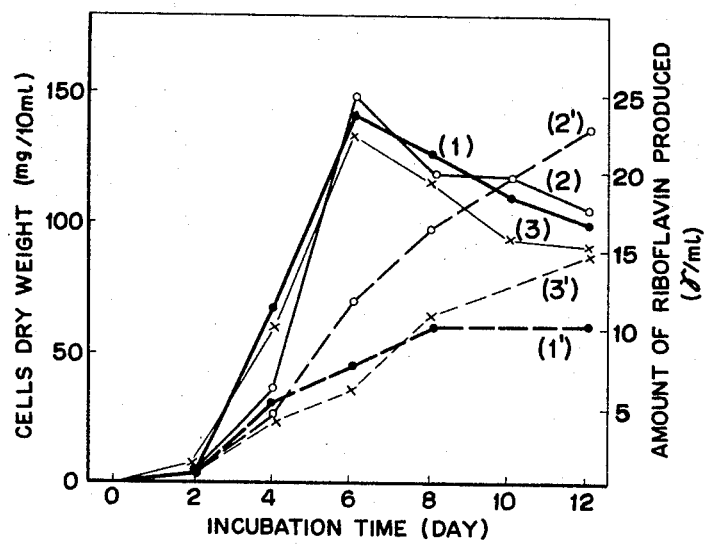
FIG. I
(1). CELLS WEIGHT OF PICHIA MISO; (1'). RIBOFLAVIN PRODUCED BY PICHIA MISO.
(2). CELLS WEIGHT OF PICHIA MISO MOGI; (2'). RIBOFLAVIN PRODUCED BY PICHIA MISO MOGI.
(3). CELLS WEIGHT OF PICHIA MOGII; (3'). RIBOFLAVIN PRODUCED BY PICHIA MOGII.
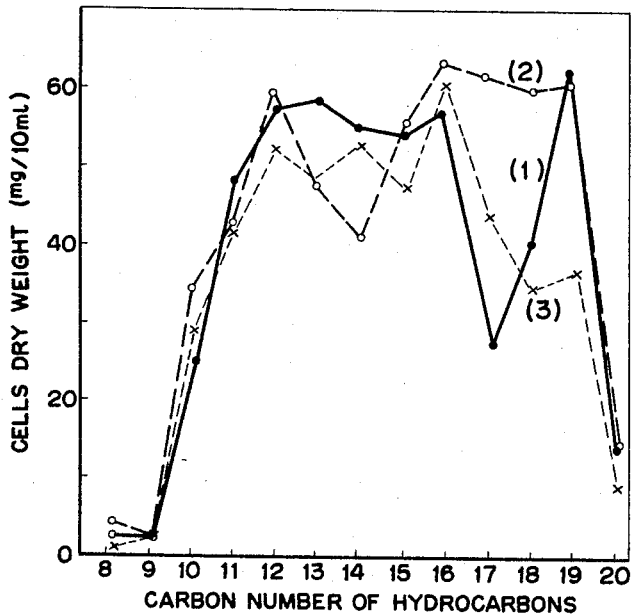
FIG. 2
(1). CELLS WEIGHT OF PICHIA MISO.
(2). CELLS WEIGHT OF PICHIA MISO MOGI.
(3). CELLS WEIGHT OF PICHIA MOGII.

3,433,707
METHOD FOR THE PREPARATION OF RIBOFLAVIN
Tadao Matsubayashi, Urawa-shi, and Yahiko Suzuki, Tokyo, Japan, assignors to Dai Nippon Seito Kabushiki Kaisha, Tokyo, Japan, a corporation of Japan, and The Nitto Institute of Chemical Research, Urawa-shi, Japan, a juridical foundation of Japan
Filed May 13, 1966, Ser. No. 549,934
Claims priority, application Japan, May 24, 1965, 40/30,195
U.S. Cl. 195—28    10 Claims
Int. Cl. C12d 5/04

ABSTRACT OF THE DISCLOSURE

Riboflavin is produced in substantial yield as a metabolic product of the yeast species *Pichia miso, Pichia miso* Mogi and *Pichia mogii* growing in hydrocarbon culture meda.

---

This invention relates to a method for the preparation of riboflavin by fermentation.

Particularly, the present invention is featured by subjecting a micro-organism having ability of utilizing hydrocarbon and synthesizing riboflavin by aerobic fermentation in a culture medium containing hydrocarbon as the main source of carbon and thereby producing and accumulating riboflavin in said culture medium.

We made researches on the microbial utilization of hydrocarbon. As the results, we could find out that some kinds of microorganisms capable of growing on hydrocarbons as carbon source produce riboflavin as metabolic product in the culture medium and then we established the method of the present invention.

Hitherto, there have been some reports that amino acids, fatty acids, lipase and the like are produced as metabolic products of hydrocarbon-utilizing micro-organisms. Also, with respect to the preparation of riboflavin, there was a report that riboflavin is yielded as constitutive substance within cells of hydrocarbon-utilizing micro-organisms (Nature, vol. 197, page 14 ,1963). However, production and accumulation of riboflavin in the culture medium, which is the feature of the present invention, has not been known.

As to the conventional methods of preparing riboflavin by fermentation, there have been known some methods in which plant pathogens such as *Eremothecium ashbyii, Ashbya gossypii* and the like and yeasts such as *Candida guilliermondia* and the like are used as micro-organism, and agriculturally produced secchariferous materials especially glucose, molasses, starch conversion products and other carbohydrates are chiefly used as carbon source. However, these methods have disadvantages of unstability in supply of raw materials and price thereof.

The object of the present invention is to provide a method in which nowadays mass-produced and cheaply available hydrocarbons can be used as main carbon source for riboflavin fermentation.

Other objects and advantages of the present invention will be apparent from the following descriptions.

The present invention provides a method for the preparation of riboflavin which comprises culturing a yeast belonging to Pichia genus in a culture medium containing hydrocarbon as main carbon source and recovering riboflavin produced and accumulated in said culture medium.

The micro-organism, which is used in the present invention, is a yeast belonging to Pichia genus; such as *Pichia miso, Pichia miso* Mogi such as IFO-0604, *Pichia mogii* such as IFO-0193 or the like. The sign "IFO" is abbreviation of Institute for Fermentation (Juso Nishinocho, Osaka, Japan). These species have been well characterized and have been described in the Journal of the Agricultural Chemical Society of Japan, vol. 15 (1939), pp. 921–932, 1023–1036 and 1221–1232, and vol. 28 (1954) pp. 122–125.

The carbon source for culture medium in the present invention may be various kinds of hydrocarbons singly or in the mixture of two or more of them.

The hydrocarbons are preferably aliphatic hydrocarbons having 10–20 carbon atoms or mixtures thereof with aromatic hydrocarbons; such as decane, undecane, dodecane, tridecane, tetradecane, pentadecane, hexadecane, heptadecane, octadecane, nonadecane and further crude oil, gasoline, kerosene, light gas oil, fuel oil, ligroin, benzine, naphtha, liquid paraffin, paraffin, paraffin wax, and the like. Further in addition to said hydrocarbons, an adequate quantity of organic acids, starch, sugars and the like may be added as the other carbon source.

Because these hydrocarbons are hardly dissolved in water, they should be contacted with the aqueous culture solution as well as possible, for instance, in the form of fine powder in cases they are solid or in the form of suspension made by agitating vigorously together with the aqueous solution in cases they are liquid. Suitable suspending aids or resolving aids may be used.

The culture is preferably conducted under aerobic conditions of shaking culture, cultures with agitation and/or aeration, and submerged culture.

In the culture medium, as nitrogen source, inorganic nitrogen compounds such as ammonium salts, nitric acid salts and the like and organic nitrogen compounds such as casein, urea, amino acids and the like may be added as desired. As inorganic salts, potassium dihydrogen phosphate, magnesium sulfate and other inorganic salts may be added as desired. As the other additives, corn steep liquor, yeast extract, meat extract, peptone, vitamins and other nutrilites and growth promoting substances and so on may be added.

Though the micro-organisms can grow at pH 2 to 8 of the culture solution, it is preferable to control the pH of the culture medium, which tends to be varied by metabolic products during culture, to be at pH 5 to 7 with an acid or an alkali as required.

Culture time is usually 2 to 15 days and usual culture temperature is about 25° C. to 40° C.

In order to harvest riboflavin produced and accumulated in the culture medium, well known procedures can be applied. Particularly, after culture, the culture solution is subjected to centrifugation to separate the remaining hydrocarbon, cells and supernatant liquor. The supernatant liquor is concentrated if necessary and is subjected to hydrosulfite reduction precipitating operation to isolate riboflavin. Further, little riboflavin included in cells also can be recovered in the similar way.

Since the remaining hydrocarbon can be used repeatedly, even micro-organisms having low hydrocarbon-utilizing ability can be employed in the present invention.

The following examples merely illustrate the present invention but never restrict the same.

The Example 2 refers to FIG. 1, which is a graph showing growth (cells dry weight) of Pichia yeasts and amount of riboflavin produced in the culture medium containing n-hexadecane as carbon source.

The Example 4 refers to FIG. 2, which is a graph comparing effects of carbon number of various hydrocarbons on growths of riboflavin-producing micro-organisms.

Example 1

150 ml. of the culture medium, after mentioned, were poured into 500 ml. shaking flask and then pure cell suspension of *Pichia miso* was inoculated in said medium.

The inoculated medium were cultivated aerobically with shaking at 30° C. for 12 days. At the end of the period, the riboflavin produced and accumulated per litre of culture medium was 51.0 mg., while cells contained only 13.6 micrograms ($\gamma$) riboflavin per gram of cells dry weight. The determination of riboflavin was conducted according to lumiflavin fluorescence method.

Composition of culture medium:

| | G. |
|---|---|
| n-Hexadecane | 25.8 |
| Urea | 1.87 |
| Potassium dihydrogen phosphate ($KH_2PO_4$) | 2.50 |
| Magnesium sulfate | 1.00 |
| Corn steep liquor | 0.10 |
| Polyoxyethylene sorbitan monolaurate | 0.225 |
| Sorbitan monolaurate | 0.275 |
| City water, 1 l., pH 6.0. | |

Example 2

Using the similar composition of culture medium and in the similar procedure as in Example 1, various Pichia species; *Pichia miso*, *Pichia mogii* and *Pichia miso* Mogi were cultivated and the growth (cells dry weight) and the riboflavin production in the medium were followed at intervals during incubation. The final riboflavin production amounts per one litre of culture medium were respectively 10.5 mg. with *Pichia miso*, 23.0 mg. with *Pichia mogii* and 15.0 mg. with *Pichia miso* Mogi.

The above results are shown in FIG. 1.

Example 3

150 ml. of the culture medium, after mentioned, were poured into 500 ml. shaking flask and then pure suspension of *Pichia miso* was cultivated in said medium. The inoculated medium were cultivated aerobically with shaking at 30° C. for 12 days. At the end of the period, the riboflavin produced and accumulated per litre of culture medium was 13.6 mg.

Composition of culture medium:

| | G. |
|---|---|
| Kerosene | 31.0 |
| Ammonium sulfate | 4.50 |
| Potassium dihydrogen phosphate ($KH_2PO_4$) | 2.50 |
| Magnesium sulfate | 1.00 |
| Corn steep liquor | 0.10 |
| Polyoxyethylene sorbitan monolaurate | 0.225 |
| Sorbitan monolaurate | 0.275 |
| City water, 1 l., pH 6.0. | |

Example 4

150 ml. of the culture medium, after mentioned, were poured into 500 ml. shaking flask and then pure cell suspension of Pichia species; *Pichia miso*, *Pichia mogii* and *Pichia miso* Mogi were inoculated in said medium. The inoculated medium was cultivated aerobically with shaking at 30° C. for 5 days.

As to the compositon of culture media, were used culture media employing, in place of n-hexadecane in the culture medium of Example 1, an aliphatic hydrocarbon single substance such as octane ($C_8$), nonane ($C_9$), decane ($C_{10}$), undecane ($C_{11}$), dodecane ($C_{12}$), tridecane ($C_{13}$), tetradecane ($C_{14}$), pentadecane ($C_{15}$), hexadecane ($C_{16}$), heptadecane ($C_{17}$), octadecane ($C_{18}$), nonadecane ($C_{19}$), and eicosane ($C_{20}$).

As the results of examining growth of yeast and production of riboflavin in the respective culture medium, it was found that these strains of Pichia species grow in the culture media containing hydrocarbons having carbon number in the range from decane ($C_{10}$) to nonadecane ($C_{19}$) and the yeast growth is followed by the production and accumulation of riboflavin in culture medium. With a strain of *Pichia miso* Mogi, 17.2 mg./l. of riboflavin were produced in the case using dodecane and 11. 2 mg./l. of riboflavin were produced in the case using hexadecane.

The above results are shown in FIG. 2.

Reference Example 1

Using the similar composition of culture medium and in the similar manner as in Example 1, a strain of *Candida japonica*, a hydrocarbon-utilizing yeast outside the present invention, gave only 3.6 mg. riboflavin per one litre of culture medium and 2.8$\gamma$ per gram of cells dry weight.

Reference Example 2

The same strain of *Pichia miso* as used in Example 1 was inoculated in the similar manner as in Example 1 except that the hydrocarbon in the medium was replaced by glucose as carbon source. The production of riboflavin in one litre of the culture medium was only 2.1 mg.

What is claimed is:

1. A method for the preparation of riboflavin which comprises culturing a yeast belonging to Pichia genus selected from the group consisting of *Pichia miso*, *Pichia miso* Mogi and *Pichia mogii* in a culture medium containing hydrocarbon as major carbon source and recovering riboflavin produced and accumulated in said culture medium.

2. A method according to claim 1 in which the yeast is *Pichia miso*.

3. A method according to claim 1 in which the yeast is *Pichia miso* Mogi.

4. A method according to claim 1 in which the yeast is *Pichia mogii*.

5. A method according to claim 1 in which the hydrocarbon is one member selected from the group consisting of aliphatic hydrocarbons having 10 to 20 carbon atoms and mixtures thereof with aromatic hydrocarbons.

6. A method according to claim 1 in which the hydrocarbon is one member selected from the group consisting of decane, undecane, dodecane, tridecane, tetradecane, pentadecane, hexadecane, heptadecane, octadecane, nonadecane, crude oil, gasoline, kerosene, light gas oil, fuel oil, ligroin, benzine, naphtha, liquid paraffin, and paraffin wax.

7. A method according to claim 1 in which the culture is conducted under aerobic conditions including shaking culture, cultures with agitation and aeration, and submerged culture.

8. A method according to claim 1 in which the pH of culture medium is controlled to be at pH of 5 to 7.

9. A method according to claim 1 in which the culture time is a period from 2 to 15 days.

10. A method according to claim 1 in which the culture temperature is a temperature from about 25° C. to about 40° C.

References Cited

UNITED STATES PATENTS

| 2,363,227 | 11/1944 | Burkholder. | |
|---|---|---|---|
| 2,702,265 | 2/1955 | Smiley et al. | 195—28 |
| 3,193,390 | 7/1965 | Champagnet et al. | 195—82 |

ALVIN E. TANENHOLTZ, *Primary Examiner*.

U.S. Cl. X.R.

198—82, 100